(12) United States Patent
Baird et al.

(10) Patent No.: US 10,858,071 B1
(45) Date of Patent: Dec. 8, 2020

(54) UNIVERSAL COVER

(71) Applicant: Dowco, Inc., Manitowoc, WI (US)

(72) Inventors: David Baird, Marshfield, MO (US); Caleb Stith, Lebanon, MO (US)

(73) Assignee: Dowco, Inc., Manitowoc, WI (US)

( * ) Notice: Subject to any disclaimer, the term of this patent is extended or adjusted under 35 U.S.C. 154(b) by 0 days.

(21) Appl. No.: 16/597,823

(22) Filed: Oct. 9, 2019

(51) Int. Cl.
*B60J 11/00* (2006.01)
*B63B 17/02* (2006.01)
*B60J 11/04* (2006.01)

(52) U.S. Cl.
CPC ............ *B63B 17/02* (2013.01); *B60J 11/04* (2013.01)

(58) Field of Classification Search
CPC ....... B60J 11/025; B60J 11/04; B63B 17/023; E04H 15/06
See application file for complete search history.

(56) References Cited

U.S. PATENT DOCUMENTS

| | | |
|---|---|---|
| 559,506 A | 5/1896 | Swain |
| 2,570,533 A | 10/1951 | Elliott |
| 2,571,362 A | 10/1951 | Hervey |
| 2,646,097 A | 7/1953 | Gaverth |
| 2,732,877 A | 1/1956 | Taylor |
| 2,821,989 A | 2/1958 | Harwood |
| 2,961,725 A | 11/1960 | McGee |
| 3,059,659 A | 10/1962 | Ipsen |
| 3,122,394 A | 2/1964 | Bryden |
| 3,172,419 A | 3/1965 | Lewis |
| 3,186,129 A | 6/1965 | Blood |
| 3,354,892 A | 11/1967 | Frieder |
| 3,399,687 A | 9/1968 | Frieder |
| 3,426,400 A | 2/1969 | Lauro |
| 3,489,452 A | 1/1970 | Plante |
| 3,572,353 A | 3/1971 | Pinkley |
| 3,574,367 A | 4/1971 | Jankowski |
| 3,654,648 A | 4/1972 | Wilhoit |
| 3,698,409 A | 10/1972 | Koontz |
| 3,810,267 A | 5/1974 | Fussell et al. |
| 4,075,723 A | 2/1978 | Bareis |
| 4,132,335 A | 1/1979 | Ingram |
| 4,209,098 A | 6/1980 | Adams |
| 4,194,636 A | 9/1980 | Byram et al. |
| 4,273,278 A | 6/1981 | Storm |

(Continued)

FOREIGN PATENT DOCUMENTS

| | | |
|---|---|---|
| FR | 2753166 | 3/1998 |
| GB | 2198396 | 6/1988 |

(Continued)

OTHER PUBLICATIONS

Website screenshot https://www.youtube.com/watch?v=9BElmomRxV4; Sea to Summit-13 Liter Lightweight Dry Sack by TheGearTester—YouTube; published Dec. 4, 2015.

(Continued)

*Primary Examiner* — Andrew Polay
(74) *Attorney, Agent, or Firm* — Shane Delsman Godfrey & Kahn, S.C.

(57) ABSTRACT

A cover for an object, such as a boat, that can accommodate at least one optional feature of the object. The cover has at least one area that can be expanded to accommodate an optional feature of the object or collapsed if the object does not have an optional feature.

29 Claims, 12 Drawing Sheets

(56) References Cited

U.S. PATENT DOCUMENTS

| | | | |
|---|---|---|---|
| 4,406,386 A | 9/1983 | Rasor et al. |
| 4,596,105 A | 6/1986 | Farmer |
| 4,639,033 A | 1/1987 | Wheatley et al. |
| 4,754,905 A | 7/1988 | Bott |
| 4,771,897 A | 9/1988 | Ho |
| 4,863,082 A | 9/1989 | Evans et al. |
| 4,869,378 A | 9/1989 | Miller |
| 4,993,351 A | 2/1991 | Zirkelbach et al. |
| 5,014,458 A | 5/1991 | Wagner |
| 5,058,652 A | 10/1991 | Wheatley et al. |
| 5,152,574 A | 10/1992 | Tucker |
| 5,189,980 A | 3/1993 | Zirkelbach et al. |
| 5,201,487 A | 4/1993 | Epplett |
| 5,215,032 A | 6/1993 | Ellis et al. |
| 5,303,667 A | 4/1994 | Zirkelbach |
| 5,322,296 A | 6/1994 | Weimerskirch |
| 5,438,789 A | 8/1995 | Emory |
| 5,479,872 A | 1/1996 | Hulett |
| 5,522,409 A | 6/1996 | May |
| 5,577,856 A | 11/1996 | Tezuka |
| 5,617,909 A | 4/1997 | Duginske |
| 5,664,793 A | 6/1997 | Engibarov |
| 5,697,320 A | 12/1997 | Murray |
| 5,706,752 A | 1/1998 | Menne, Jr. |
| 5,743,204 A | 4/1998 | Tweet |
| 5,743,208 A | 4/1998 | Miller |
| 5,768,966 A | 6/1998 | Duginske |
| 5,803,104 A | 9/1998 | Pollen |
| 5,839,388 A | 11/1998 | Vadney |
| 5,901,657 A | 5/1999 | Schwartz |
| 5,941,594 A | 8/1999 | O'Neill |
| 5,970,904 A | 10/1999 | Wellen et al. |
| 6,006,692 A | 12/1999 | Szukhent, Jr. |
| 6,053,558 A | 4/2000 | Weldy |
| 6,079,051 A * | 6/2000 | Whinston .......... A41D 13/0005 2/108 |
| 6,089,781 A | 7/2000 | Kellberg |
| 6,129,034 A | 10/2000 | Santa Cruz et al. |
| 6,152,312 A | 11/2000 | Nava et al. |
| 6,209,477 B1 | 4/2001 | Biedenweg |
| 6,227,505 B1 | 5/2001 | Van Order et al. |
| 6,257,306 B1 | 7/2001 | Weldy |
| 6,481,679 B1 | 11/2002 | Bennett et al. |
| 6,561,117 B1 | 5/2003 | Kell |
| 6,591,541 B1 | 7/2003 | Cummings |
| 6,637,364 B1 | 10/2003 | Campeau |
| 6,666,163 B2 | 12/2003 | Pastor |
| 6,672,241 B2 | 1/2004 | Warfel |
| 6,688,668 B2 | 2/2004 | Stevens |
| 6,698,603 B2 | 3/2004 | Lawson et al. |
| 6,789,495 B2 | 9/2004 | Brower et al. |
| 6,837,661 B2 | 1/2005 | Schwarz et al. |
| 6,871,749 B2 | 3/2005 | Bostick et al. |
| 6,886,489 B2 | 5/2005 | Zarn et al. |
| 6,895,887 B2 | 5/2005 | Raiter |
| 6,983,716 B1 | 1/2006 | Ankney |
| 7,063,035 B2 | 6/2006 | Belcher |
| 7,107,926 B2 | 9/2006 | Fishburn |
| 7,204,466 B2 | 4/2007 | Hsieh |
| 7,255,511 B2 | 8/2007 | Dolan |
| 7,341,231 B2 | 3/2008 | Zarn |
| 7,380,363 B1 | 6/2008 | Olofsson et al. |
| 7,401,995 B2 | 7/2008 | Senakiewich, II |
| 7,418,919 B2 | 9/2008 | Smith et al. |
| 7,430,981 B2 | 10/2008 | Malcore |
| 7,448,523 B2 | 11/2008 | Aftanas et al. |
| 7,458,333 B2 | 12/2008 | Yang |
| 7,517,117 B2 | 4/2009 | Moreland et al. |
| 7,536,971 B1 | 5/2009 | Fry |
| 7,547,170 B2 | 6/2009 | Womack et al. |
| 7,571,691 B2 | 8/2009 | Russikoff |
| 7,634,875 B2 | 12/2009 | Genschorek |
| 7,669,723 B2 | 3/2010 | Kao |
| 7,717,278 B2 | 5/2010 | Kao |
| 7,895,964 B2 | 3/2011 | Russikoff |
| 7,921,797 B2 | 4/2011 | James |
| 7,950,342 B2 | 5/2011 | Russikoff |
| 8,070,378 B2 | 12/2011 | Gargaro, III et al. |
| 8,418,708 B2 | 4/2013 | Benish |
| 8,616,511 B2 | 12/2013 | James |
| 8,752,498 B1 | 6/2014 | Schwindaman |
| 8,875,646 B2 | 11/2014 | Zirkelbach et al. |
| 8,950,416 B1 | 2/2015 | Spellman |
| D773,691 S | 12/2016 | Hough |
| D773,695 S | 12/2016 | Hough |
| 9,718,517 B2 | 8/2017 | Zirkelbach et al. |
| 9,759,373 B2 | 9/2017 | Hough |
| 9,783,267 B1 | 10/2017 | Alexander et al. |
| 10,300,633 B2 | 5/2019 | Alexander et al. |
| 10,336,406 B2 | 7/2019 | Alexander |
| 2002/0106240 A1 | 8/2002 | Johnson, Jr. |
| 2005/0067542 A1 | 3/2005 | Zarn |
| 2006/0120797 A1 | 6/2006 | Mortensen |
| 2006/0133893 A1 | 6/2006 | Harashirna et al. |
| 2008/0066794 A1 | 3/2008 | Durfee |
| 2009/0194016 A1 | 8/2009 | Murphy |
| 2009/0293797 A1 | 12/2009 | Kent |
| 2010/0083891 A1 | 4/2010 | Russikoff |
| 2010/0290931 A1 | 11/2010 | Burnett et al. |
| 2011/0290170 A1 | 12/2011 | Russikoff |
| 2014/0026803 A1 | 1/2014 | Musacchio |
| 2014/0047550 A1 | 2/2014 | Chase |
| 2015/0166144 A1 | 6/2015 | Langley |
| 2015/0210150 A1 | 7/2015 | Alexander |
| 2016/0129974 A1 | 5/2016 | Hough |
| 2017/0057600 A1 | 3/2017 | Hough |

FOREIGN PATENT DOCUMENTS

| | | |
|---|---|---|
| GB | 270307 | 7/1988 |
| JP | 2556629 | 11/1996 |
| JP | 2007009589 | 1/2007 |

OTHER PUBLICATIONS

Website screenshot https://www.youtube.com/watch?v=2qhNBqXFrME; How to install a contour fit PWC cover—YouTube; published Nov. 8, 2007.

Website screenshot https://www.youtube.com/watch?v=wX3pinLR4_s; Explore the eBags TLS Expandable 22 Carry-On—YouTube; captured Nov. 28, 2012.

Website screenshot; https://web.archive.rg/web/20131108112133/http://www.canvas-boat-cover-and-repair-advisor.com/boat-cover-supports.html; Nov. 8, 2013.

Website screenshot; https://web.archive.org/web/20131020233755/http://www.wayfair.com/Navigloo-19-t0-22%C2%BD-ft-Storage-System-Fishing-Runabout-with-Tarpaulin-Cover-3370-NAV1004.html; Oct. 20, 2013.

Website screenshot; https://www.youtube.com/watch?v=-1jGOfijlVM; published Dec. 12, 2013.

Website screenshot; https://web.archive.org/web/20120820000834/http://www.websweeper.com/php/boat_covers/bc-018.php; Aug. 20, 2012.

Website screenshot; http://web.archive.org/web/20130925032949/http://www.outdoorfabricscanada.com/Vents-Mooring-Support_c_304.html; Sep. 25, 2013.

Brochure; Dec. 10, 2013; Side-Winder Pontoon Roll Cover.

Website screenshot; https://www.youtube.corn/watch?v=RepAaagwbQ; link to youtube video titled How to Use Bennington's Quick Clip Mooring cover; captured Feb. 20, 2015; published Jun. 10, 2013.

Website screenshot; http://www.boattest.com/boats/boat_video.aspx? ID=3035; BoatTest.com; captured Feb. 20, 2015; (prior art for purposes of prosecution).

Website screenshot; http://www.ebay.com/itm/HARRIS-KAYOT-FSH-230-PONTOON-BOAT-COVER-BURGUNDY-W-VENTS-MARINE-BOAT-/191343936000; ebay listing of Harris Kayot FSH 230 Pontoon Boat Cover Burgundy w/Vents Marine Boat; captured Feb. 20, 2015; date identified on tag Oct. 6, 2010.

(56) References Cited

OTHER PUBLICATIONS

Website screenshot; https://shop.pontoons.com/store/detail/259/playpen_storage_covers_miscellaneous_canvas/2002/j_clip_kit_bl; Premier Marine, Inc.; captured Feb. 20, 2015; (prior art for purposes of prosecution).

Website screenshot; http://www.crestliner.com/crestliner-legacy/; Crestliner Legacy; captured Feb. 20, 2015; date clip J-Hook introduced 2005.

Brochure and catalog for Harris Flotebote; vol. 4; issue 1; 2013.

Photograph of Bennington Clip; 2015; (prior art for purposes of prosecution).

Photograph of Bennington Clip; 2015; (prior art for purposes of prosecution).

Website screenshot; https://www.youtube.com/watch?v=k9vbnj5KYq0; admitted prior art for the purposes of prosecution.

\* cited by examiner

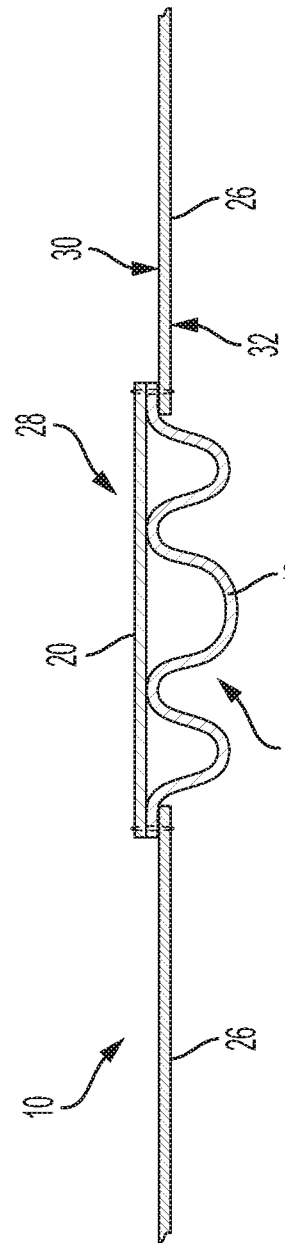
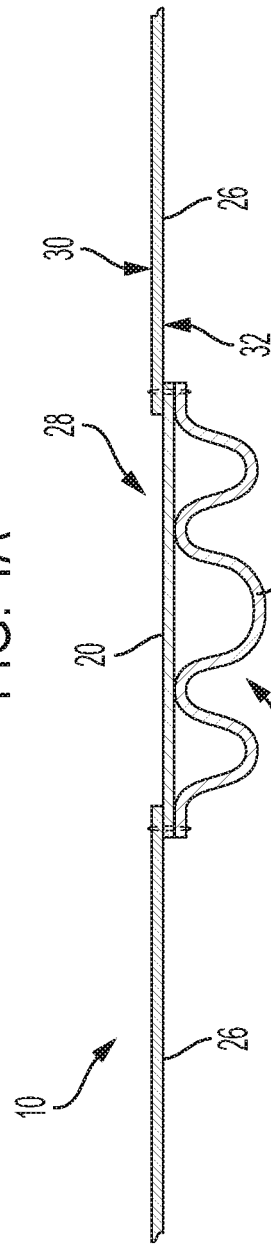
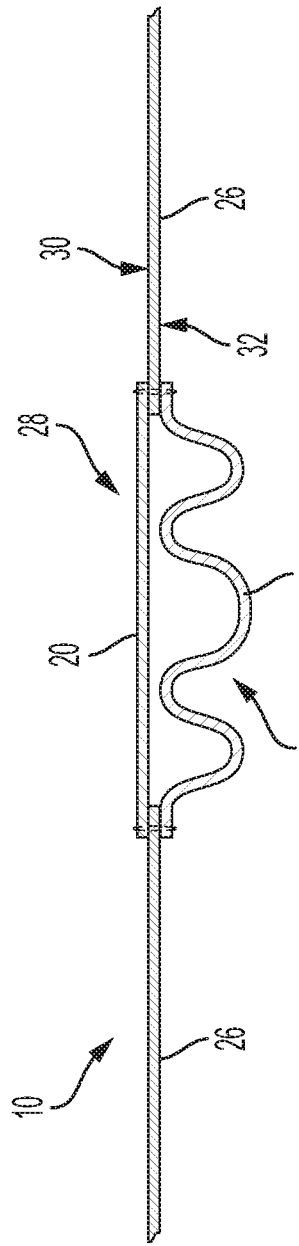

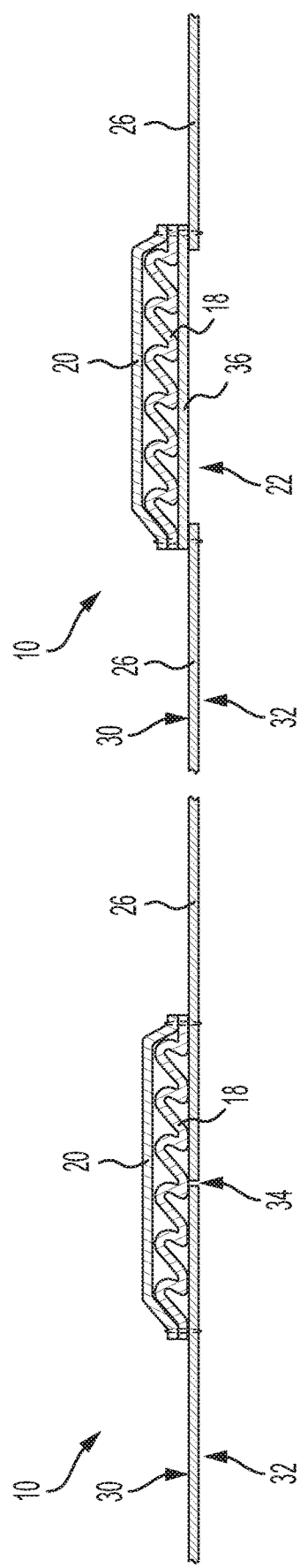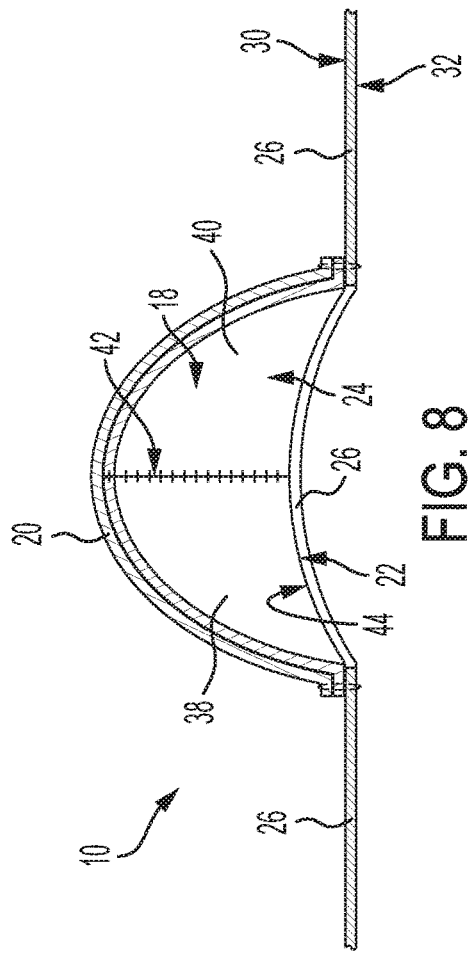

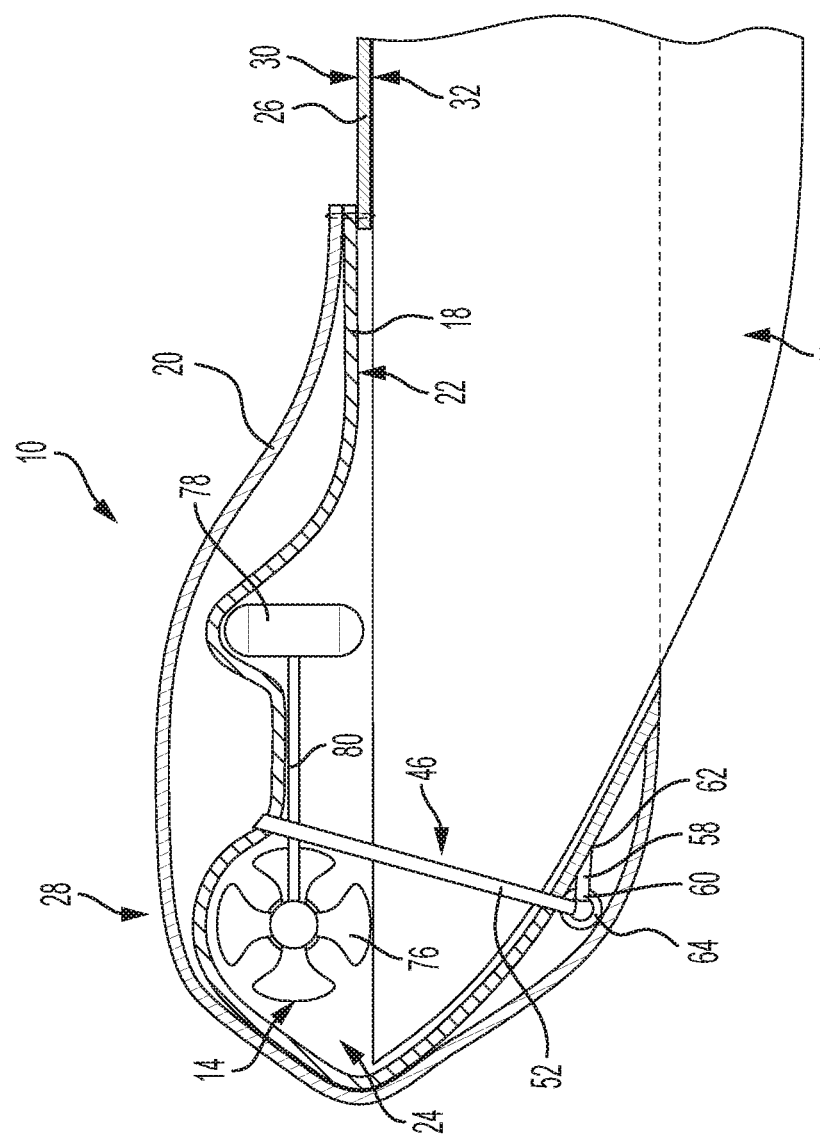

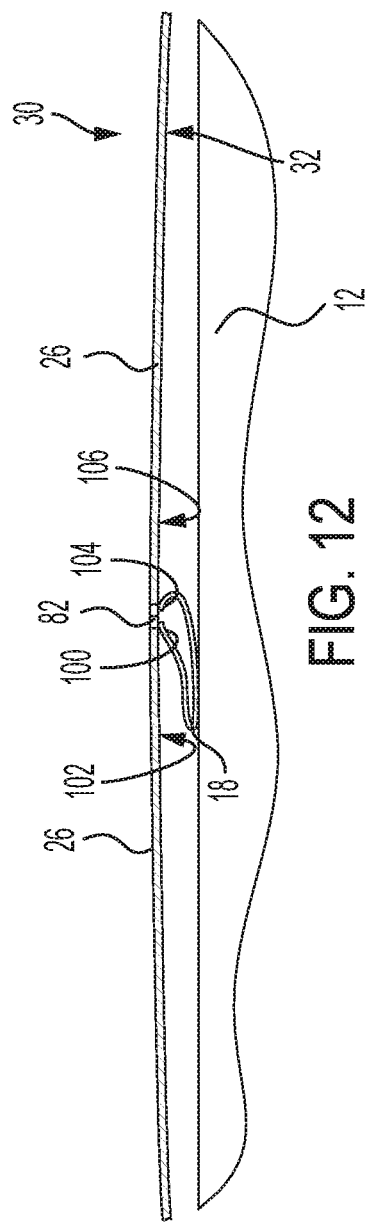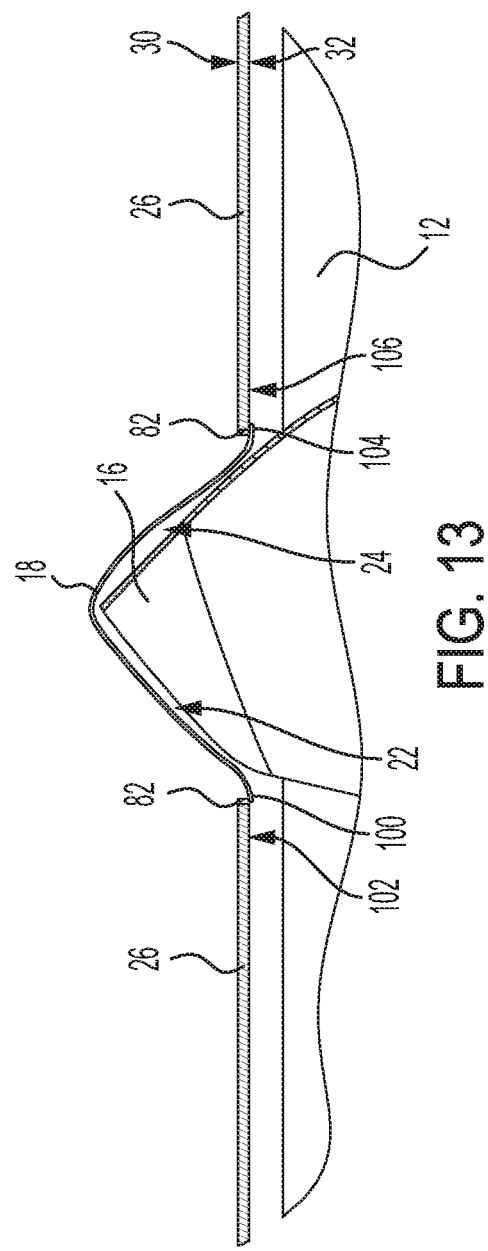

UNIVERSAL COVER

FIELD OF THE INVENTION

The present invention relates generally to the field of covers.

BACKGROUND

Many objects that are exposed to elements, for example by being outdoors, can benefit from being covered. Some examples include, vehicles, grills, furniture, and outdoor equipment, to name a few. Covers are used to prevent dust, water, snow, ice, leaves, bird droppings, other debris, animals, and ultraviolet radiation from degrading the object. Generally, covers must be sized or capable of being stretched such that they are larger than the structure they are designed to cover. This allows the cover to be more easily put on the object. The cover must also be given shape so that the water runs towards and off the sides of the object. The more form-fitted the cover is to the object, the less entry points, e.g. gaps, and the less wind and other elements will create entry points for debris, elements, etc. from reaching the object.

One example of such an object that is often used with a cover is a vehicle, e.g. a boat, such as before and after use. Some types of objects, such as vehicles, grills, furniture, and outdoor equipment, come in many different models, shapes, configurations and sizes. While a single cover can be sized to cover the largest of such object configurations such that it will fit all configurations of the object, the single cover will then not be optimum for any configuration and provide many entry points. This can lead to an unpleasant visual appearance and poor performance or even failure. For example, if the cover is too big for a given configuration, the cover may sag. This may not only be unsightly, but the sagging may also allow water to pool or otherwise collect. Such pooling can lead to water penetrating the cover, stretching or damaging the cover and/or damage to the covered object.

Another approach is to have a specific cover for each configuration of the object such that the cover is form fitted with a nice visual appearance and better performance. However, the number of different cover configurations can increase costs for such covers by increasing the cost for manufacturing, storage and distribution and even shelf space at a retailer. Further, if an owner customizes or otherwise changes the object post-purchase, they may need to buy a new cover.

As such, there is a need for a small number or even single cover that covers many different models, shapes, configurations and sizes of an object.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

BRIEF DESCRIPTION OF THE DRAWINGS

FIG. 4a is a cross-sectional elevation view of the cover of FIG. 3 taken along the line 4a-4a.

FIG. 4b is a cross-sectional elevation view of an alternative embodiment of a cover.

FIG. 4c is a cross-sectional elevation view of an alternative embodiment of a cover.

FIG. 6 is a cross-sectional elevation view of an alternative embodiment of a cover.

FIG. 7 is a cross-sectional elevation view of an alternative embodiment of a cover.

FIG. 8 is a cross-sectional elevation view of an alternative embodiment of a cover.

FIG. 9 is a partial cross-sectional elevation view of the cover and an elevation view of the boat in FIG. 2 taken along the line 9-9.

FIG. 12 is a partial cross-sectional elevation view of an alternative embodiment of a cover and an elevation view of a boat with the opening closed.

FIG. 13 is a partial cross-sectional elevation view of an alternative embodiment of a cover and an elevation view of a boat with the opening expanded.

DETAILED DESCRIPTION

In one embodiment, the invention provides a covering for an object with a number of optional equipment, models, shapes, configurations and sizes. The covering includes a fabric sized to cover at least a portion of the object. Although the embodiments described further herein reference a boat, the cover could be designed to be used with other types of vehicles, e.g. cars, personal watercraft, motorcycles, bicycles, etc., or other objects, e.g. grills, furniture, outdoor equipment, etc.

Figure 1:
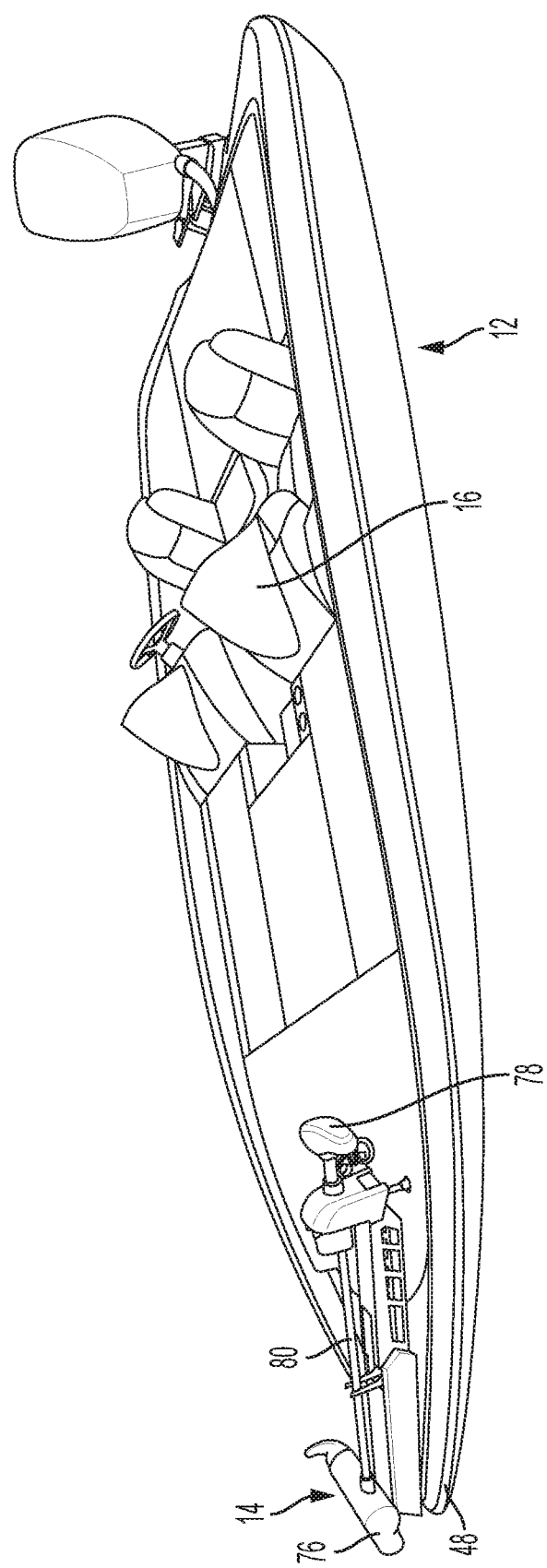
FIG. 1 is a side perspective view of a boat with optional features.

FIG. 1 illustrates one example of a type of object intended to be used with a cover or covering 10, namely a boat 12. The boat 12 in FIG. 1 includes optional equipment such as a trolling motor 14 and a passenger windscreen 16. Other optional equipment, e.g. additional seats, a passenger console, bimini top, ski tower, outboard motor, anchor, seat back, rod holder, accessory mount, fish finder, etc., could be included or excluded without defeating the spirit of the invention.

Figure 2:
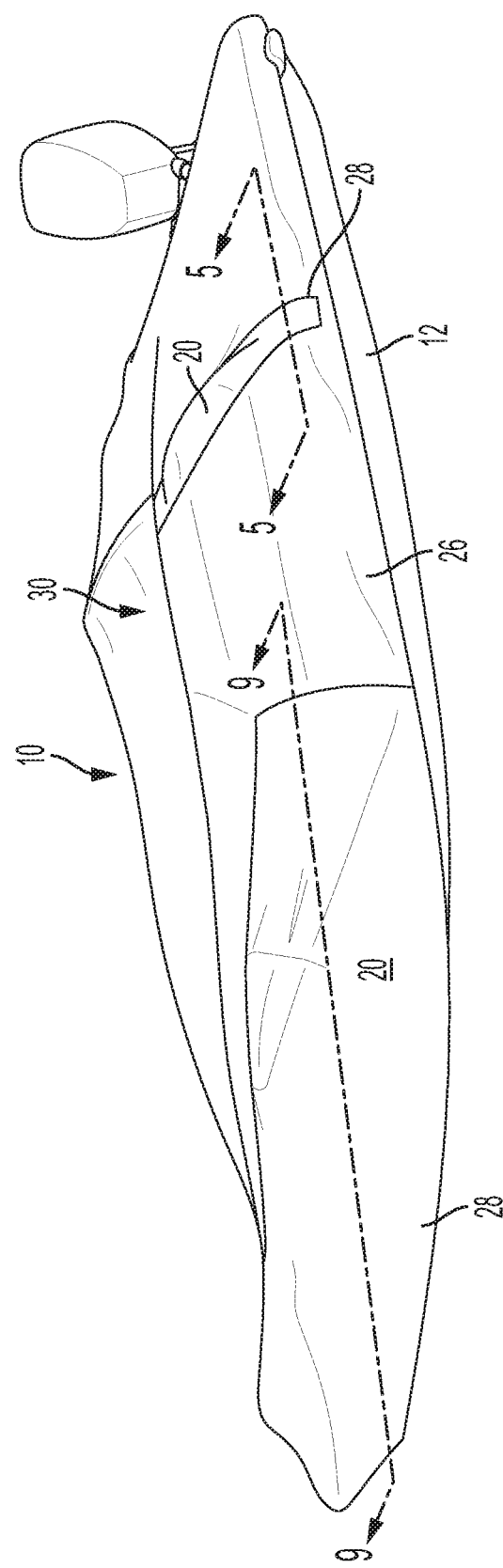
FIG. 2 is side perspective view of a cover applied to the boat of FIG. 1.
Figure 3:
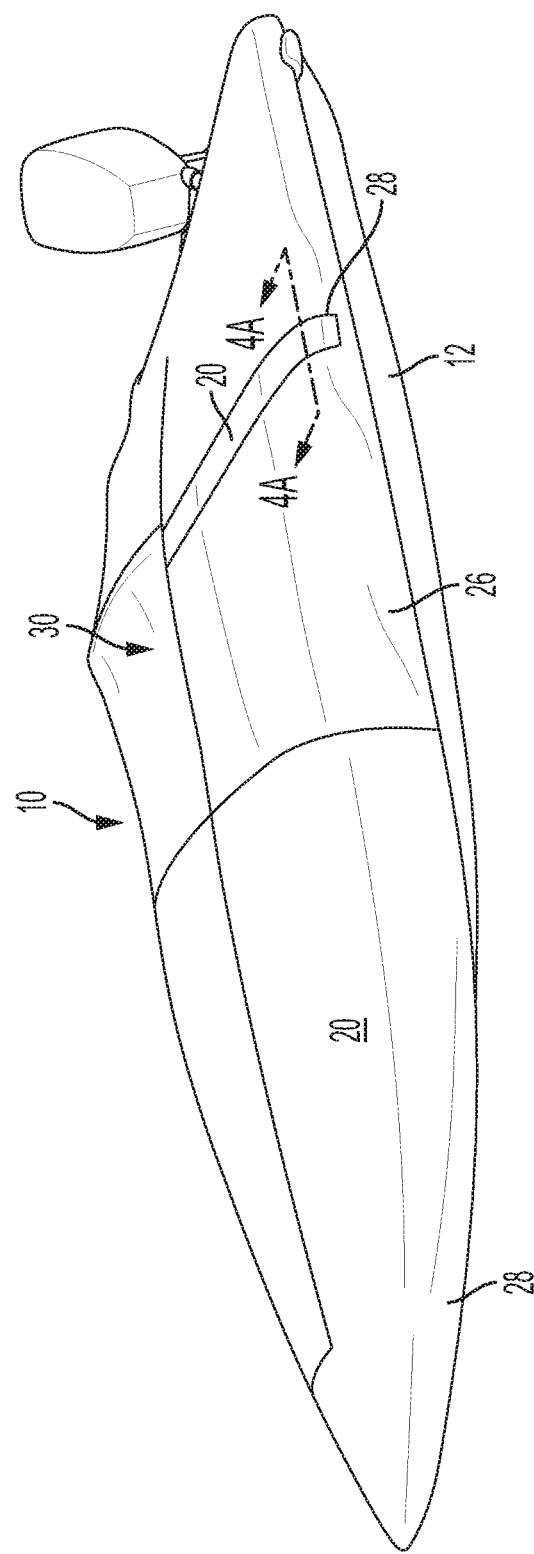
FIG. 3 is side perspective view of a cover applied to the boat without optional features.

As seen in FIG. 2, the cover 10 can cover the boat 12 with the additional equipment and, as seen in FIG. 3, cover a boat with no additional, in either case, the cover is form fitted to the object with little to no sagging or entry points.

The cover 10 can generally include a lower layer of material 18, which can be made from a traditional cover material, such as canvas, and an upper layer of material 20, which can be made from a material that can expand or stretch, such as elastic or spandex. Although certain materials are described above, other materials could be used, for example a stretchable film, elastic net/mesh, reinforced rubber material, specialty woven patterns such as knits, accordion folded materials, multi-layer material, 4-way stretch/3D fabric, etc., for the lower cover material and, for example, tarp, plastic sheeting, any woven material coated, laminated, or dipped in another material/chemical for improved weather resistance such as laminated woven scrim/woven coated polyethylene, etc., for the upper cover material, without defeating the spirit of the invention.

The lower layer of material 18 is generally sized to the largest configuration of the boat 12 and the upper layer of material 20 is generally sized to fit the smallest configuration of the boat 12. When the cover 10 is applied to the smallest configuration of the boat 12 the lower layer of material 18 will be folded, bunched or otherwise not fully expanded, while the upper layer of material 20 will be mostly, if not fully, expanded, but only stretched a little if at all, e.g. as seen in FIG. 4*a*. Because the not fully expanded lower layer of material 18 is below the mostly, if not fully, expanded upper layer of material 20, the cover 10 has minimal to no visible sagging, which provides a nice appearance and good performance.

Figure 5:
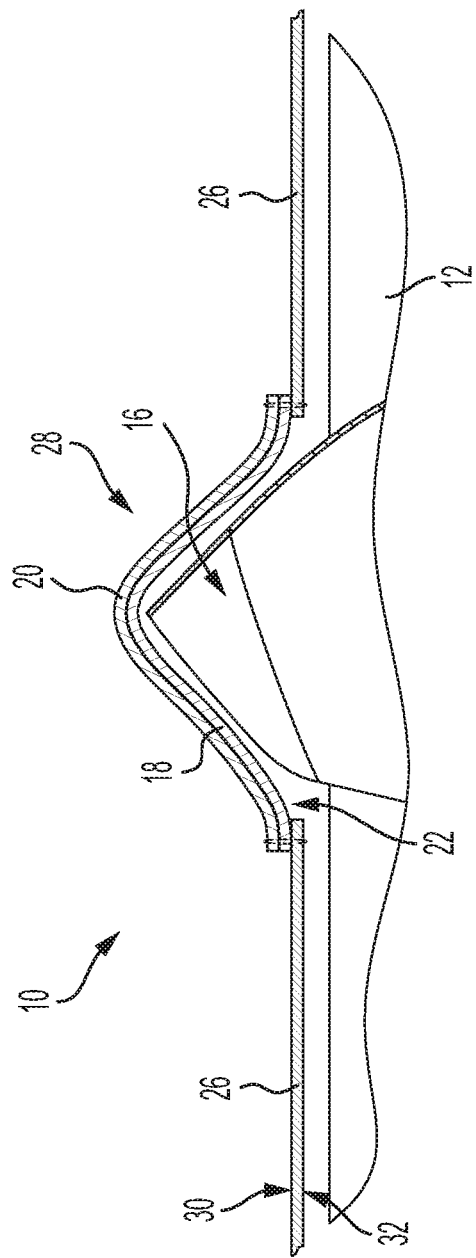
FIG. 5 is a is a partial cross-sectional elevation view of the cover and an elevation view of the boat in FIG. 2 taken along the line 5-5.

When the cover 10 is applied to the largest configuration of the boat 12, the lower layer of material 18 will be unfolded, unbunched or otherwise mostly, if not fully expanded, and the upper layer of material 20 will not only be mostly, if not fully, expanded, but also stretched, as seen in FIG. 5. In this configuration too, the cover 10 has minimal to no sagging, which provides a nice appearance and good performance.

As seen in FIG. 5, when the cover 10 is applied to the largest configuration of the boat 12 or a boat with an optional feature, in this example a boat with a windscreen 16, at least a portion of the windscreen extends into or through the opening 22 in the base or first layer of material 26. At least a portion of the lower layer of material 18 unfolds or expands to form a pocket 24 that covers and/or encloses the portion of the windscreen 16 extending through the opening 22. The second or upper layer of material 20 stretches to a first size to cover the third or lower layer of material 18 and the portion of the windscreen 16 extending through the opening 22. In this first position, at least a portion of the upper layer of material 20 and at least a portion of the lower layer of material 18 are above the base layer of material 26.

In FIGS. 4*a*-4*c*, the cover 10 is applied or attached to a boat 12 without a structure or feature. In the embodiment, seen in FIGS. 4*b*-4*c*, the lower layer of material 18 does not extend into the opening 22. In FIGS. 4*a*-4*c*, the upper layer of material 20 has no or a little stretch such that it is a second size and the upper layer of material and the lower layer of material 18 are in the second position, which is closer to the deck of the boat than the first position. The upper layer of material 20 is stretched greater when it is in the first position than when it is in the second position and the second size of the upper layer of material is smaller than the first size.

In one embodiment, as seen in FIG. 2, the cover 10 has a base layer of material 26, which can be made from a traditional cover material, such as canvas. In the illustrated embodiment, the cover 10 has panels 28 located over areas where additional optional equipment is located on the boat 12 or where expansion of accommodation is needed to fit a different shape, configuration or size of boat.

In the embodiment seen in FIG. 2, one panel 28 is located above the passenger windscreen 16 and another panel above the location of a trolling motor 14. The panels 28 have a lower layer of material 18, such as canvas, and an upper layer of material 20, such as spandex. The lower layer of material 18 is generally sized to receive or accommodate the additional feature, in the embodiment seen in FIG. 5, the windscreen 16, and the upper layer of material 20 is generally sized to accommodate the boat 12 without the feature or structure. In the embodiment seen in FIGS. 4*a*-4*c*, the upper layer of material 20 and lower layer of material 18 are generally attached to the base layer of material 26 to cover the opening 22. In FIGS. 4*a*-4*b*, the perimeter of the upper layer of material 20 is attached to the perimeter of the lower layer of material 18 such that the lower layer of material is below the upper layer of material when the cover 10 is applied to the boat 12.

In the embodiment seen in FIG. 4*a*, the panel 28, including the upper layer of material 20 and the lower layer of material 18, is attached to a top side 30 of the base layer of material 26. In the embodiment seen in FIG. 4*b*, the panel 28, including the upper layer of material 20 and the lower layer of material 18, is attached to a bottom or under side 32 of the base layer of material 26. Alternatively, as seen in FIG. 4*c*, the upper layer of material 20 could be attached to the top side 30 of the base layer of material 26 and the lower layer of material 18 could be attached to a bottom side 32 of the base layer of material.

The panel 28 could be attached to the cover 10 in a number of ways. One example, as seen in FIG. 5, is that the base layer of material 26 has an opening, passage or slot 22 formed therein and located in the area of the cover 10 above the additional feature, in this embodiment, the passenger windscreen 16, when the cover is attached to a vehicle. The panel 28 is sized such that it generally fits the opening 22. The perimeter of the panel 28 is then positioned in or over the opening 22 and attached to the base layer of material 26, such as sewing the perimeter of the panel 28 to the perimeter of the base layer of material 26 forming the opening 22. The panel 28 could be attached to the base layer of material 26 in a number of ways known in the art, including gluing, melting, bonding, snaps, buttons, zippers, hooks and loops, etc., the use of which would not defeat the spirit of the invention.

In another embodiment, seen in FIG. 6, the first or base layer of material 26 is generally sized to fit the smallest configuration of the boat 12 and to cover at least a portion of the boat, such as, for example, a deck. A panel 28 is attached to the top side 30 of the base layer of material 26 to cover the opening 22 located in the area of the cover 10 above the additional feature when the cover is attached to the boat 12. The base layer of material 26 is then cut 34 below the area of the panel 28 to create an opening 22, such that the larger lower layer of material 18 unfolds or unfurls and the upper material stretches to an accommodate the additional feature, for example the passenger windscreen 16.

In another embodiment, seen in FIG. 7, the panel 28 is formed by a control panel layer of material 36 that sized to fit an opening 22 in the base layer of material 26 of the cover 10. A lower cover material 18, positioned between the control panel layer of material 36 and the upper layer of material 20, is generally sized to receive or accommodate the additional feature, in this embodiment, a windscreen 16. The upper layer of material 20 is generally sized to accommodate the location of the boat 12 without a windscreen 16, but can expand to accommodate the location of the boat with a windscreen 16. The perimeter edge of all three layers can be sewn or otherwise attached together. The panel 28 is positioned in, on or under the opening 22 and attached to the base layer of material 26, such as being sewing the perimeter of the panel 28 to the perimeter of the base layer of material 26 forming the opening 22.

In the embodiment seen in FIG. 7, if the cover 10 is used with a boat 12 without the structure or feature, e.g. windscreen 16, the cover 10 can be used as it is. If it is desired to use the cover 10 with a boat 12 with the structure or feature, e.g. windscreen 16, the control panel layer of material 36 can be cut, similar to that seen in FIG. 6, such that the windscreen can be accessed via an opening 22 to the lower layer of material 18.

The panel 28 can also be shaped or formed to accommodate a specific feature. For example, in FIG. 8, the panel 28 is configured to accommodate a passenger windscreen 16, which is an option for some brands and/or models of boats. The lower layer of material 18 is comprised of a first lower material 38 and a second lower material 40. The first lower material 38 and a second lower material 40 have a semi-circular shape with the rounded perimeter edges 42 attached to one another, such as by stitching. The straight edges 44 can be attached to the perimeter of the upper layer of material 20 and then attached to the base layer of material 26. This configuration for panel 28 provides a pocket 24 that is shaped generally like that of the windscreen.

Using a base layer of material 26 helps prevent the upper layer of material 20 from over stretching. For example, if the cover 10 was made entirely from a stretchable material, such as spandex, the cover would stretch significantly in locations where features were located and minimally in other locations. This could lead to deformation or damage to the cover 10, including holes being torn. Further, the use of spandex is more expensive than, for example, a canvas material, and limiting its use to the locations needed provides cost saving advantages. Spandex or elastic is generally less puncture, wear, water and ultraviolet light resistant than other traditional cover materials, such as canvas.

If only a stretchable material was used, for example, sewn into the cover in the openings 22 of the base layer of material 26 at locations of features, certain locations of the stretchable material may over stretch and others only minimally stretch. The use of a base layer of material 26 and a lower layer of material 18, helps control the amount and location the upper layer of material 20 is stretched. However, only a lower layer of material 18, as described in alternative embodiments below, or only an upper layer of material 20, for example a robust elastic material, can be used without defeating the spirit of the invention.

The cover 10 can also include one or more limiters 46 helps control the amount and location the upper layer of material 20 is stretched. In one embodiment, a panel 28 is used to accommodate a trolling motor 14 located near the bow of the boat 12. Because covers 10 are often put on the bow 48 first, as the cover is stretched over the remainder of the boat 12, the bow panel 50 can over stretch. A limiter 46 can control or limit the amount of stretch of a given panel 28.

Figure 10:
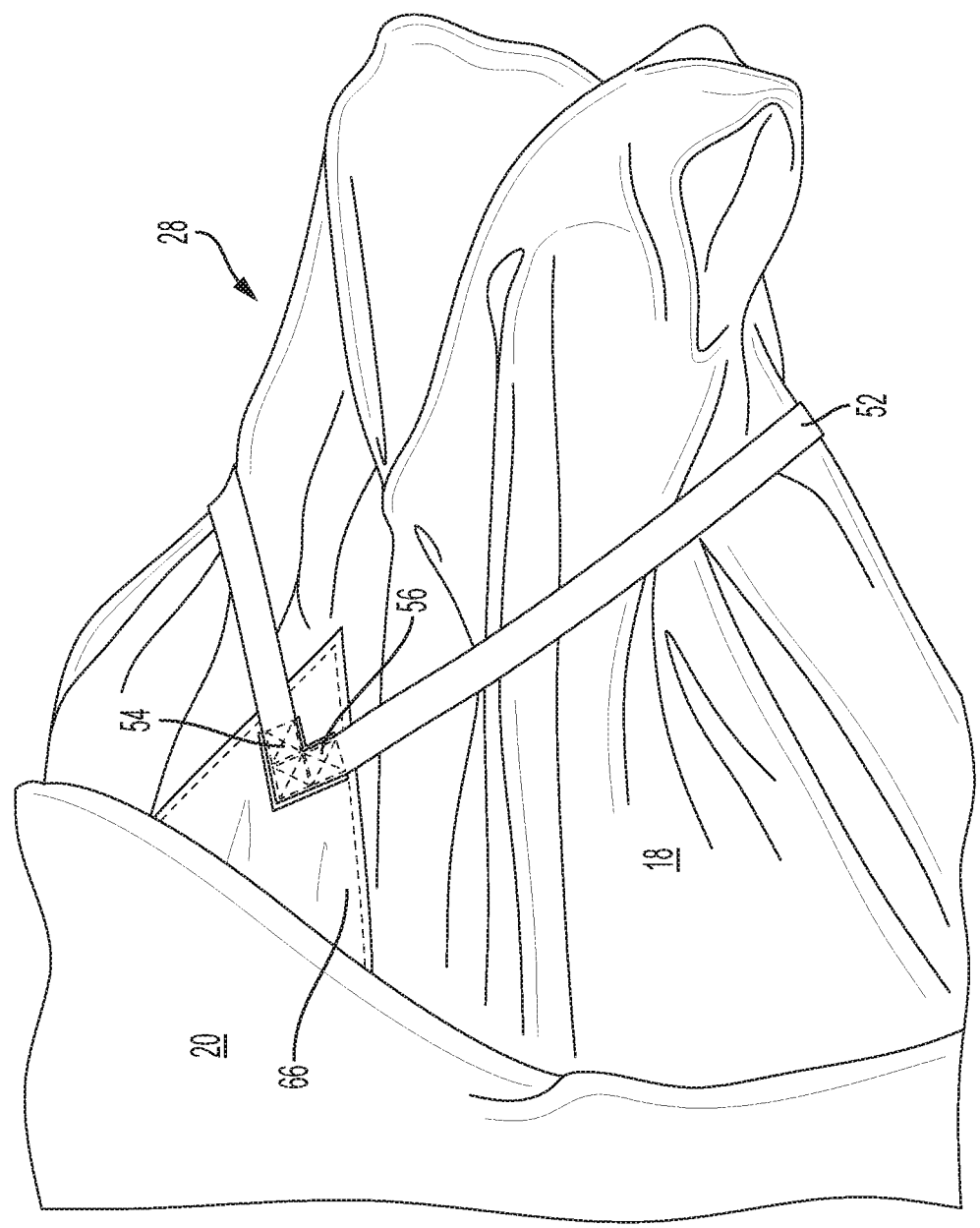
FIG. 10 is a perspective view of the limiter with the upper layer of material partially removed.

FIGS. 9-10 discloses one embodiment of such a limiter 46 that uses one or more straps. As seen in FIG. 9, the limiter 46 has a first strap 52 with a first end 54 and a second end 56. The first end 54 and second end 56 of the strap 52 are secured to the cover 10, in this example, to the lower layer of material 18, such that it forms a loop through which the bow 48 of the boat 12 and the trolling motor 14 fit. The bow 48 of the boat 12 is inserted through the limiter 46 into the front of the cover 10, e.g. panel 28. The trolling motor 14 is inserted through the limiter 46 and into the pocket 24. The cover 10 is then installed on the rest of the boat 12. The strap 52 is sized to form a loop such that as the cover 10 is installed on the boat 12 and pulled towards the stern, the panel 28 can expand until the strap 52 reaches a portion of the bow 48 that cannot fit through the strap. At that point, the panel 28 is prevented from expanding any further and the cover 10 is held in position at the bow 48 of the boat 12. The load applied to the cover 10 while applying to the boat 12 is transferred from the panel 28, for example, the stretchy upper layer of material 20, to the strap 52. Transferring the load to the strap also helps reduce the load on the cover 10 from being transferred to optional features under the cover.

In one embodiment, seen in FIG. 9, the limiter 46 includes a second strap 58 with a first end 60 and a second end 62. The first end 60 of the second strap 58 is attached to the middle of the cover 10, in this example, to the lower layer of material 18, under the bow 48 of the boat 12 when the cover is attached to the boat. The second end 62 of the second strap 58 is attached to a ring 64. The first strap 52 extends through the ring 64. The use of a ring 64, allows the first strap 52 remain positioned under the center of the bow 48 of the boat 12 and balances the force load applied to the strap regardless of the size or configuration of trolling motor 14 or whether there even is a trolling motor.

In the embodiment seen in FIG. 9, the first and second straps 52, 58 are positioned between the upper layer of material 20 and lower layer of material 18 to present an uninterrupted appearance to the cover 10. One or both of the first and second straps 52, 58 can also be attached to a reinforcement material or member 66 to prevent the forces acting on the limiter 46 from tearing the cover 10. In the embodiment seen in FIG. 10, a reinforcement member 66 made from canvas, although other materials, including fabric, fiber reinforced laminated plastic, webbing strap, leather, synthetic leather such as poromeric, polyvinylchloride, cork, callagen, etc. could be used, is attached to the cover 10, such as being sewn to the lower layer of material 18. The first 54 and second ends 56 of the strap 52 are then attached to the reinforcement member 66, such as being sown. As discussed above, the strap 52 could be attached to the cover 10 in a number of ways known in the art, including gluing, melting, bonding, snaps, buttons, zippers, hooks and loops, etc., the use of which would not defeat the spirit of the invention. The first end 60 of the second strap 58 could also or alternatively be attached to a reinforcement member 66.

Alternatively or additionally, the straps of one or more limiters could be oriented in a horizontal, vertical, or diagonal direction(s) to further control the alignment of the front of the cover over the bow area of the boat and/or the orientation, tilt, or position of the loop of the strap 52. For example, a limiter could be located to engage the structure, e.g. a trolling motor, in addition or alternative to going around the structure as described above and seen in FIGS. 9-10. For example, the limiter could be only a portion of a loop and be perpendicular to the strap 52 shown in the embodiment seen in FIGS. 9-10. Multiple straps can cooperate to limit the movement and/or alignment of the cover, such as by forming a saddle. Limiters could also be used in any location of the cover and could be adjustable, for example by rings, buckle clips, ratchet, etc., to accommodate more variations of a feature of an object.

Figure 11:
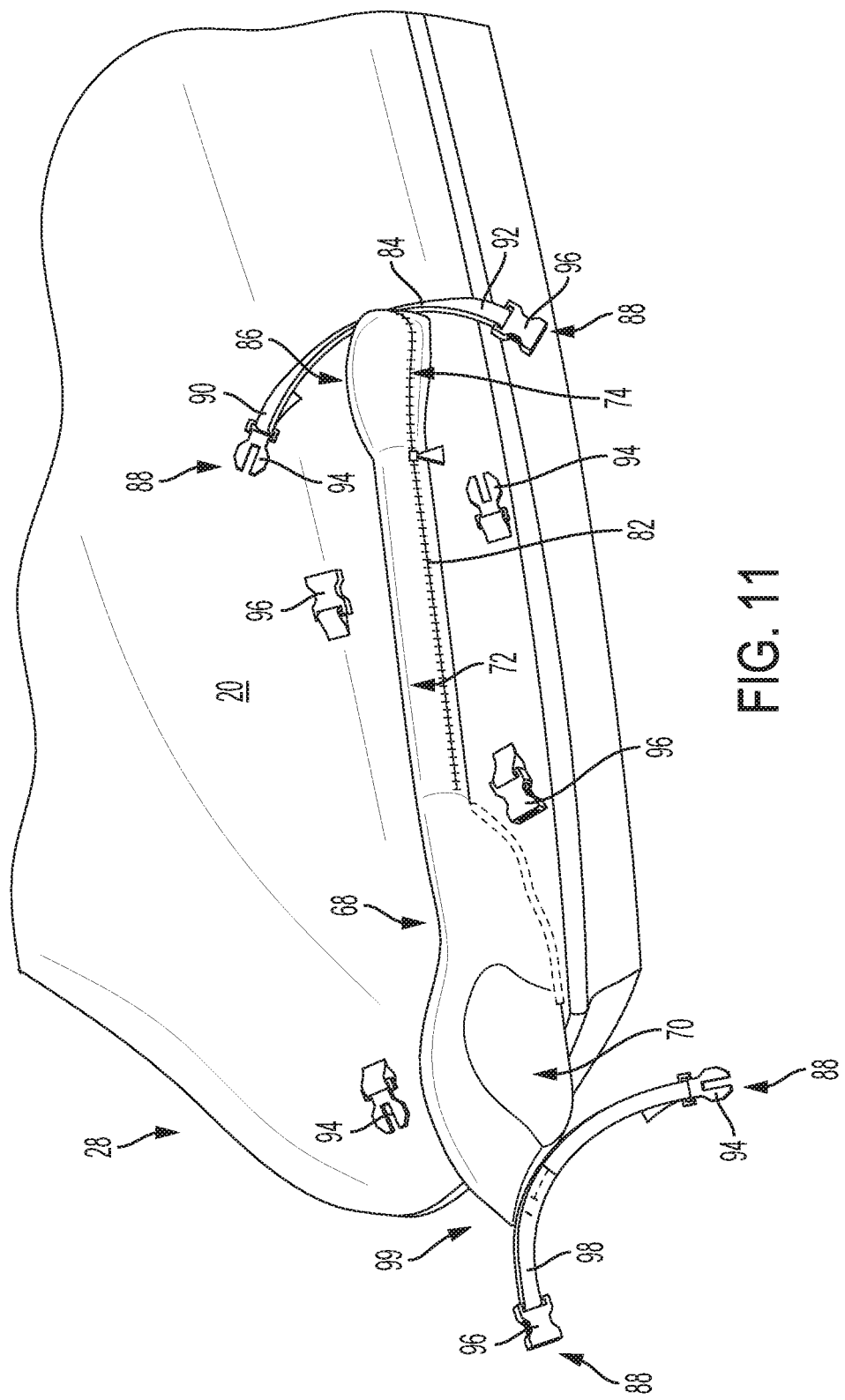
FIG. 11 is a perspective view of an exterior pocket and cover.

Other methods of providing a cover 10 that can accommodate an object with a number of optional equipment, models, shapes, configurations and sizes can also be used. For example, an exterior pocket 68 can be formed at a location of the cover 10 above an optional feature. In the embodiment seen in FIG. 11, an exterior pocket 68 is formed over the trolling motor 14 including a propeller pocket 70, sleeve 72 and motor pocket 74 for the propeller end 76, shaft 80 and control head end 78 of the trolling motor respectively.

The exterior pocket 68 could be shaped to more closely fit the feature or more generally to make it easier to apply the cover 10. In the embodiment seen in FIG. 11, the sleeve 72 is shaped to more closely fit the shaft 80 of a trolling motor 14, and the motor pocket 74 to fit control head end 78. Because the control head end 78 of the trolling motor 14 would not fit through the sleeve 72, a zipper 82 can be used to open the sleeve 72 and motor pocket 74 such that the control head end 78 of the trolling motor 14 can be passed through the opening of the sleeve 72 and positioned in the motor pocket 74.

Once the control head end 78 of the trolling motor 14 is in the motor pocket 74, the shaft 80 in the sleeve 72 and the propeller end 76 in the propeller pocket 70, the zipper 82 can be used to close the sleeve 72 around the shaft and the motor pocket 74 around control head end 78 of the trolling motor 14.

Allowing the motor pocket 74 and propeller pocket 70 to be free, extend or protrude from the base layer of material 26 or cover, allows the pockets to be adjusted, such as by rolling. One or more ends of the exterior pocket 68 can include an adjusting means for decreasing the size of the exterior pocket to the size of the feature. In one embodiment, shown in FIG. 11, the adjusting means includes a strap 84 attached to a first end 86 of the exterior pocket 68, e.g. the motor pocket 74. The first strap 84 can include a fastener 88 on one or more ends of the strap. In the embodiment shown in FIG. 11, each end of the first 90 and second end 92 of the strap 84 has a fastener 88, e.g. one part of a side squeeze buckle, namely a male end 94 (e.g. spring arms) and a female end 96 (a frame for receiving and selectively holding the male end).

If the exterior pocket 68 is larger than the feature for which it is accommodating, the end can be rolled up around the strap 84 to make the pocket 68 smaller. The fasteners 88 on the two ends 90, 92 of the strap 84 can be attached to each other to hold the rolled up portion of the pocket 68 in place or attached to counterpart fasteners, e.g. buckle portions, attached to the cover 10, e.g. the upper layer of material 20. The pocket 68 can also include a second strap 98 with fasteners 88 for making the second end 99 of the exterior pocket, e.g. propeller pocket 70, smaller.

The exterior pocket 68 can utilize a single layer of material, such as a base layer of material 26 or have a lower layer of material 18 and a stretchable upper layer of material 20 such that the cover 10 has minimal to no sagging, which provides a nice appearance and good performance.

The cover 10 could alternatively or additionally utilize re-closable or selectively closeable fasteners or devices 88 including, but not limited to snaps, buttons, zippers, hooks and loops, clips, straps, rings, ties, etc. in other locations. For example, the control panel layer of material 36 as discussed with regards to FIG. 6, could use a portion of a buckle on a first side of the opening 22 and a reciprocal portion of a buckle on the other or second side of the opening to allow the windscreen to access the pocket 24 of the lower layer of material 18 when the buckle is separated. This allows the opening 22 to be selectively openable and/or closable. If the selectively closeable fasteners or devices 88 are located below the upper layer of material 20, for example if the fastener is attached to the control panel layer of material 36, the fastener may be at least partially opened before the cover 10 is attached to the boat.

In another embodiment, seen in the FIGS. 12-13, the base layer of material 26 of the cover 10 has a zipper 82 sewn into it such that the opening 22 can be selectively accessed when the cover is on a boat 12. In the embodiment seen in FIG. 13, a first end 100 of the inner or lower layer of material 18 is attached to the base layer of material 26 on a first side 102 of the opening 22 and zipper 82 and the second end 104 of the lower layer of material is attached to the base layer on a second side 106 of the opening.

For example, as seen in FIG. 12, the cover 10 when applied to a boat 12 without a windscreen and the selectively closeable fastener 88 is closed, the cover is form fitted to the boat with little to no sagging or entry points. When the selectively closeable fastener 88 is opened, e.g. the teeth of the zipper 82 are unzipped, as seen in FIG. 13, the opening 22 of the base layer of material 26 is allowed to expand around at least a portion of the windscreen 16 and the windscreen is positioned in the pocket 24 of the lower layer of material 18. The lower layer of material 18 covers the windscreen 16 and both at least partially extend out of or through the zippered area or opening 22 of the cover 10 and above the base layer of material 26. The cover 10 could have any number of selectively openable openings 22.

In the embodiment shown in FIGS. 12-13, the zippered area does not have an upper layer of material 20, however an upper layer of material, e.g. a stretchable material, could be used without defeating the spirit of the invention to give the cover 10 a nice appearance and good performance. For example, an upper layer of material could extend between the zippered sides of the cover 10 and be located under the base layer of material 26 and the zipper 82, when the zipper is closed. The use of re-closable or selectively closeable devices allows the area to accommodate a large number of sizes and configurations of features. For example, for smaller features only a few of a larger number of buttons could be unbuttoned or only half of the hook and loop area be disconnected.

Figure 14:
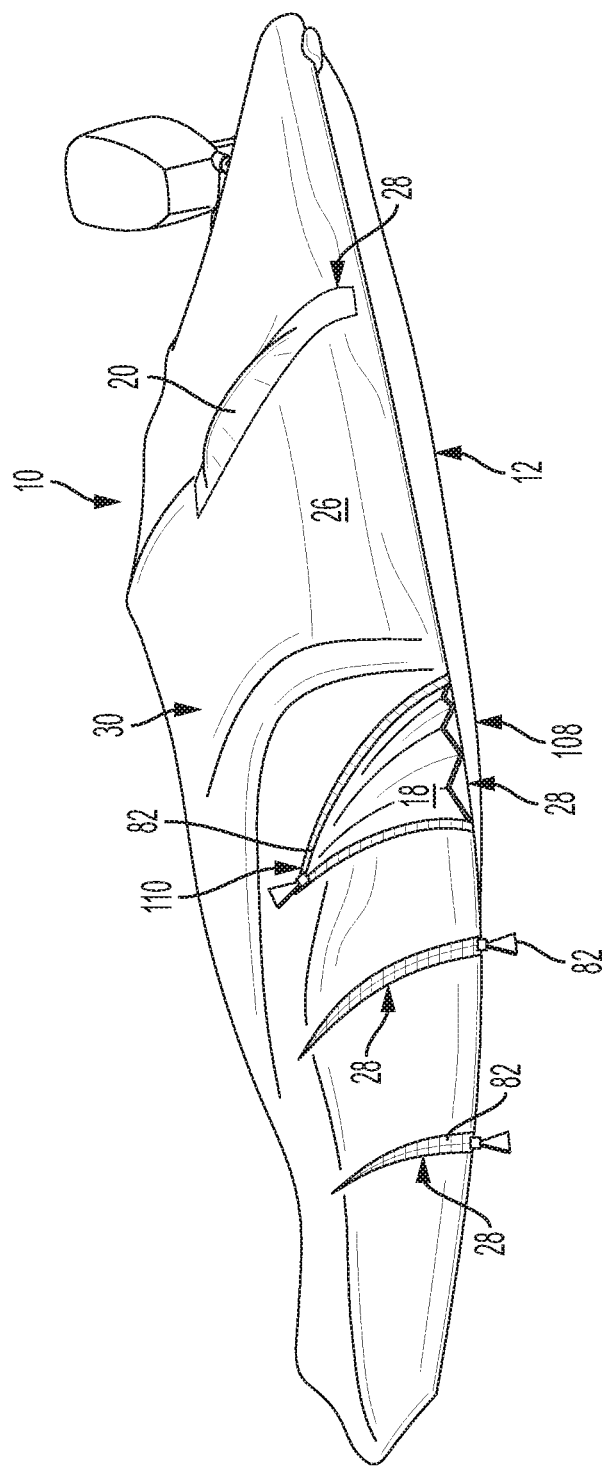
FIG. 14 is a side perspective view of an alternative embodiment of a cover on a boat with optional features.

In another embodiment seen in FIG. 14, a number of zippers 82 are used to create selectively openable openings 22 to provide greater adjustability for and closer contouring to the feature. In the embodiment shown in FIG. 14, three zippers 82 are shown over the area where a trolling motor 14 would be stored on a boat 12. The zippers 82 are attached the base layer of material 26 of the cover 10. A lower layer of material 18 is attached to the base layer of material 26 of the cover 10 and folded, pleated or otherwise bunched up under the base layer of material when the zippers 82 are zipped. When the zippers 82 are unzipped the lower layer of material 18 can unfold and opening 22 expand and the cover 10 can better accommodate the feature, such as a trolling motor 14 or the contour of the body of the boat.

In the embodiment seen in FIG. 14, the openings 22 expand more at a first end 108 of the opening 22 than a second end 110 of the opening. As discussed above, an upper layer of a stretchable material could be used between the zippered sides of the cover 10 and be located under the base layer of material 26 and the zipper 82, when the zipper is closed. The more zippers 82 that are used the more adjustable the cover is and the closer the contouring can be to the feature.

Figure 15:
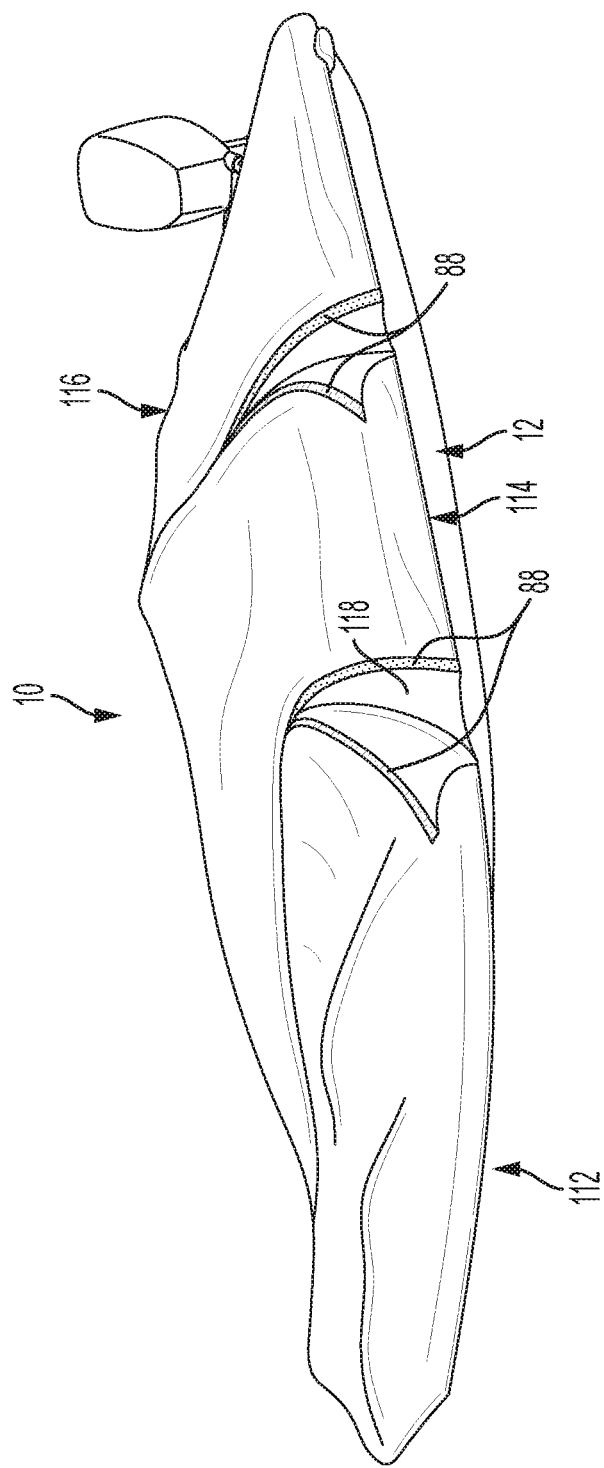
FIG. 15 is a side perspective view of an alternative embodiment of a cover on a boat with optional features.

In another embodiment, the cover 10 can include one or more interchangeable sections. For example, in FIG. 15, the cover 10 includes a bow section 112, a middle section 114 and a stern section 116. Each of the three sections, 112, 114, 116 can have re-closable or selectively closeable devices 88 including, but not limited to snaps, buttons, zippers, hooks and loops, clips, straps, rings, ties, etc., such that each section can be attached and unattached from the other sections. Each section can include a number of different sized segments that fit the shape of the section. For example, the bow section 112, can include a segment for a boat 12 without a trolling motor 14 and at least one segment that fits over a trolling motor 14. More segments could be included to fit different size trolling motors or other additional features located in that bow section 112. Different segments could also be interchangeably used for the middle section 114 and/or stern section 116.

The greater the number of different segments that are used for a given section and/or the greater number of sections, the more specifically tailored the cover 10 will be for the boat 12. However, the more segments and/or sections, the greater the cost will be for the cover such as for manufacturing, storage and distribution and even shelf space at a retailer. While each or some of the segments could be made from a single layer of material, for example, canvas, using a larger lower layer of material 18 and a smaller upper layer of material 20 could allow each segment to accommodate a number of different features, while still providing a nice appearance and good performance.

The cover 10, could also include a substrate layer of material 118 to which each segment connects. If the segment for the middle section 114 is removed, for example, the cover 10 will still generally retain its shape. For example, the substrate layer of material 118 could include areas of selectively closeable devices 88, e.g. hook material, located between each section. Each section could include selectively closeable devices 88 that attach to the selectively closeable devices on the substrate layer of material.

The cover 10 can be attached to the boat in any number of ways which are known in the art, the use of which would not defeat the spirit of the invention. For example, the rail of a boat 12 could have part of a snap that attaches to the other part of the snap which is attached to the perimeter of the cover 10. A rope, cord, strap, etc. could be attached to the cover 10, e.g. by being located in a loop or passage around the perimeter of the cover. An adjusting means, e.g. a ratchet or buckle snap, could be attached to the rope such that when the cover 10 is applied to a boat 12, the adjusting means can be used to tighten the perimeter cover to the boat. Other examples of ways of attaching a cover 10 to a boat 12 that can be used with the present invention include those disclosed in U.S. Pat. Nos. D773,691, D773,695, 9,759,373, 10,336,406, and 10,300,833 and U.S. patent application Ser. Nos. 16/286,895 and 16/373,179, which are owned by the same owner of the present invention and are incorporated herein by reference in their entirety for all purposes.

Although the invention has been herein described in what is perceived to be the most practical and preferred embodiments, it is to be understood that the invention is not intended to be limited to the specific embodiments set forth above. It is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A cover comprising:
   a first layer of material configured to cover at least a portion of a deck of a boat, the first layer of material having a passage formed therein;
   a second layer of material made from an elastic material attached to the first layer of material across the passage; and
   a third layer of material attached to the first layer of material across the passage and below the second layer of material;
   wherein when the cover is attached to a boat with a structure, at least a portion of the structure extends at least partially through the passage and at least a portion of the second layer of material and at least a portion of the third layer of material are in a first position and extend over the structure;
   wherein when the cover is attached to a boat without a structure, the at least a portion of the second layer of material and the at least a portion of the third layer of material are in a second position; and
   wherein the second position is located closer to a deck of the boat than the first position.

2. The cover of claim 1, wherein the second layer of material and the third layer of material are attached to a top side of the first layer of material.

3. The cover of claim 1, wherein the second layer of material and the third layer of material are attached to a bottom side the first layer of material.

4. The cover of claim 1, wherein the second layer of material is attached to a top side of the first layer of material and the third layer of material is attached to a bottom side of the first layer of material.

5. The cover of claim 1, wherein the second layer of material is configured such that the second layer of material is stretched greater when in the first position than when in the second position.

6. The cover of claim 3, wherein when the at least a portion of the second layer of material and the at least a portion of the third layer of material are in the second position, the at least a portion of the second layer of material and the at least a portion of the third layer of material are located above the first layer of material.

7. The cover of claim 1, further comprising a first strap attached to the third layer of material and configured such that when the cover is applied to the boat, the first strap is positioned around a bow of the boat.

8. The cover of claim 7, wherein the first strap is configured such that when the cover is applied to the boat, the first strap is positioned around a trolling motor.

9. The cover of claim 7, wherein the first strap is located between the second layer of material and the third layer of material.

10. The cover of claim 9, further comprising a second strap attached to the third layer of material at a first end of the second strap and attached to a ring at a second end of the second strap, wherein the first strap extends through the ring.

11. The cover of claim 10, wherein the first strap is attached to a reinforcement material.

12. A covering comprising:
    a base layer of material sized to cover at least a portion of a first vehicle, the base layer of material having an opening formed therein configured to be located above a structure of the first vehicle when the covering is applied to the first vehicle; and
    a panel attached to the base layer of material such that the panel encloses the opening, the panel further comprising:
        an upper layer of material made from an elastic material; and
        a lower layer of material attached to the upper layer of material;
    wherein the covering is configured such that when the covering is attached to the first vehicle with the structure, at least a portion of the structure extends into the opening, the lower layer of material covers the at least a portion of the structure extending into the opening and the upper layer of material stretches to a first size over the lower layer of material and the at least a portion of the structure extending into the opening; and wherein the covering is configured such that when the covering is attached to a second vehicle without a structure, the lower layer of material does not extend into the opening and the upper layer of material is a second size; and wherein the second size is smaller than the first size.

13. The covering of claim 12, wherein the panel is attached to a bottom side of the base layer of material.

14. The covering of claim 13, further comprising a selectively closeable device attached to the base layer of material adjacent the opening such that the opening may be selectively opened and closed.

15. The covering of claim 14, wherein the selectively closeable device is selected from a group consisting of snaps, buttons, zippers, hooks and loops, clips, straps, rings and ties.

16. The covering of claim 12, wherein the panel is attached to a top side of the base layer of material.

17. The covering of claim 16, wherein the panel further comprises a control panel layer of material attached to the lower layer of material and wherein the lower layer of material is located between the control panel layer of material and the upper layer of material.

18. The covering of claim 12, wherein the structure is a passenger windscreen.

19. The covering of claim 12, wherein the structure is a trolling motor.

20. A cover comprising:
a base layer of material sized to cover at least a portion of an object, the base layer of material having a first selectively openable slot and a second slot formed therein;
a first inner layer of material having a first end and a second end, the first end of the first inner layer of material attached to an underside of the base layer of material on a first side of the first slot and the second end of the first inner layer of material attached to the underside of the base layer of material on a second side of the first slot; and
a second inner layer of material having a first end and a second end, wherein the first end of the second inner layer of material is attached to the underside of the base layer of material on a first side of the second slot and the second end of the second inner layer of material is attached to the underside of the base layer of material on a second side of the second slot;
wherein the inner layer of material is configured such that when the cover is applied to an object and the slot is opened, the slot expands and the inner layer of material covers at least a portion of the object located in the expanded slot.

21. The cover of claim 20, wherein the inner layer of material is sized such that when the cover is applied to the object and the slot is opened, a structure of the object extends at least partially through the slot; and wherein the inner layer of material is configured such that when the structure of the object extends at least partially through the slot, the inner layer of material covers the stricture and the inner layer of material extends at least partially through the slot and above the base layer of material.

22. The cover of claim 21, further comprising a selectively closeable device attached to the base layer of material adjacent the slot such that the slot may be selectively opened.

23. The cover of claim 22, wherein the selectively closeable device is selected from a group consisting of snaps, buttons; zippers, hooks and loops, clips, straps, rings and ties.

24. The cover of claim 20, wherein the slot is configured to expand more at a first end of the slot than a second end of the slot.

25. A covering for a boat having a structure; the covering comprising:
a first layer of material configured to cover at least a portion of the boat;
a second layer of material forming a pocket, the second layer of material attached to the first layer of material and configured to enclose at least a portion of the structure when the covering is attached to the boat and the structure is in the pocket;
a strap attached to a first end of the second layer of material and configured such that the first end may be wrapped around the strap to make the pocket smaller;
a first fastener attached to a first end of the strap; and
a second fastener attached to a second end of the strap;
wherein the first fastener is configured to be selectively fastened to the second fastener to prevent the first end of the second layer of material from unwrapping.

26. The covering of claim 25, further comprising a third fastener attached to the first layer of material; and wherein one of the first fastener and second fastener are configured to be selectively fastened to the third fastener to prevent the first end of the second layer of material from unwrapping.

27. The covering of claim 25 further comprising:
a second strap attached to a second end of the second layer of material such that the second end may be wrapped around the second strap to make the pocket smaller;
a third fastener attached to a first end of the second strap; and
a fourth fastener attached to a second end of the second strap;
wherein the third fastener is configured to be selectively fastened to the fourth fastener to prevent the second end of the second layer of material from unwrapping.

28. The covering of claim 25 further comprising a zipper attached to the second layer of material and configured such that the pocket can be opened when the zipper is unzipped.

29. The covering of claim 25, wherein the structure is a trolling motor.

* * * * *

UNITED STATES PATENT AND TRADEMARK OFFICE
CERTIFICATE OF CORRECTION

| | | |
|---|---|---|
| PATENT NO. | : 10,858,071 B1 | Page 1 of 1 |
| APPLICATION NO. | : 16/597823 | |
| DATED | : December 8, 2020 | |
| INVENTOR(S) | : Baird et al. | |

It is certified that error appears in the above-identified patent and that said Letters Patent is hereby corrected as shown below:

In the Claims

Column 12 Line 4 structure should replace "stricture"

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*